(12) United States Patent
Schuba

(10) Patent No.: US 7,954,137 B2
(45) Date of Patent: May 31, 2011

(54) METHOD AND APPROACH FOR LINKING OF DEVICES WITHIN A COMMUNICATION SYSTEM

(75) Inventor: Marko Schuba, Aldenhoven (DE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 1030 days.

(21) Appl. No.: 10/530,829

(22) PCT Filed: Sep. 27, 2003

(86) PCT No.: PCT/EP03/10780
§ 371 (c)(1),
(2), (4) Date: Nov. 30, 2005

(87) PCT Pub. No.: WO2004/034237
PCT Pub. Date: Apr. 22, 2004

(65) Prior Publication Data
US 2006/0149846 A1      Jul. 6, 2006

(30) Foreign Application Priority Data
Oct. 11, 2002    (EP) .................................... 02022767

(51) Int. Cl.
G06F 7/04    (2006.01)
G06F 15/16   (2006.01)
G06F 17/30   (2006.01)

(52) U.S. Cl. ................................ 726/3; 726/6; 709/229

(58) Field of Classification Search .................. 726/3, 6; 709/229
See application file for complete search history.

(56) References Cited

U.S. PATENT DOCUMENTS

| | | | | |
|---|---|---|---|---|
| 5,668,876 A * | 9/1997 | Falk et al. | ...................... | 380/271 |
| 6,466,783 B2 * | 10/2002 | Dahm et al. | ................ | 455/414.2 |
| 6,928,558 B1 * | 8/2005 | Allahwerdi et al. | ............... | 726/9 |
| 7,149,895 B1 * | 12/2006 | Asokan et al. | ................ | 713/159 |
| 7,287,270 B2 * | 10/2007 | Kai | ................... | 726/2 |
| 7,386,878 B2 * | 6/2008 | Fernando et al. | ................. | 726/3 |

(Continued)

FOREIGN PATENT DOCUMENTS

| | | |
|---|---|---|
| EP | 1102157 A | 5/2001 |
| FR | 2819323 A | 7/2002 |
| WO | WO 01/62016 A | 8/2001 |

OTHER PUBLICATIONS

Asokan N et al Authenticating public terminals: Computer Networks, Elsevier Science Publishers BV, Amsterdam, NL vol. 31 No. 8 Apr. 23, 1999 pp. 861-870 XP004304522 ISSN 1389-1268.* Asokan Net al Authenticating public terminals: Computer Networks, Elsevier Science Publishers BV, Amsterdam, NL vol. 31 No. 8 Apr. 23, 1999 pp. 861-870 XP004304522 ISSN 1389-1268.*

Primary Examiner — William R Korzuch
Assistant Examiner — Trang Doan (57) ABSTRACT

A method for linking of a first characteristic of a first device and a second characteristic of a second device by a server is disclosed. The method comprises the steps of selecting a first linking information and a second linking information, the first linking information matching to the second linking information, sending from the server the first linking information to the first device and the second linking information to the second device, presenting by the first device the first linking information and by the second device the second linking information, entering into the first device an indication of the matching of the first linking information and the second linking information, and based on the entered indication of the matching, sending to the server a matching confirmation for confirming the matching to the server, and associating the first characteristic and the second characteristic based on the received matching confirmation.

16 Claims, 3 Drawing Sheets

U.S. PATENT DOCUMENTS

| | | |
|---|---|---|
| 2002/0103765 A1* | 8/2002 | Ohmori ............................ 705/67 |
| 2002/0116456 A1* | 8/2002 | Morita ........................... 709/203 |
| 2002/0143708 A1* | 10/2002 | Hollander et al. .............. 705/72 |
| 2002/0166047 A1* | 11/2002 | Kawamoto .................... 713/169 |
| 2003/0033254 A1* | 2/2003 | Tanaka ............................ 705/57 |
| 2003/0046541 A1* | 3/2003 | Gerdes et al. ................. 713/168 |
| 2003/0093495 A1* | 5/2003 | McNulty et al. .............. 709/217 |
| 2004/0172536 A1* | 9/2004 | Malville et al. ............... 713/169 |

* cited by examiner

Fig. 2

| ID | Trusted Device | Non-Trusted Device |
|---|---|---|
| 1a | 123456 | 123456 |
| 2a | ABCDEF | ABCDEF |
| 3a | ◆ ☐ ● | ◆ ☐ ● |
| 4a |  |  |
| 5a | 1A2B3C | 1A2B3C |
| 6a | 123 | 456 |
| 7a | ABC | DEF |
| 8a | ◆ ☐ ● | ◇ ■ ○ |
| 9a | ① ② ③ | ❶ ❷ ❸ |
| 10a | 3 + 5 = ? | 8 |
| 11a | FROG  HORSE  LION |  |

Fig. 3a

| ID | Trusted Device | | Non-Trusted Device | |
|---|---|---|---|---|
| 1b | 1.    ABCDEF<br>2.    123456<br>3.    ψδηρτζ | | 123456 | |
| 2b | ABCDEF | | A.    ABCDEF<br>B.    45T698<br>C.    $rt%tz | |
| 3b | ◆ ☐ 0 ● | | ◆ ☐ ● | |
| 4b |  | |  | 0 |
| 5b | 1A2B3C | | 1A2B3C | 0 |
| 6b | 123 | | 456 | 0 |
| 7b | ABC | | DEF | 0 |
| 8b | ◆ ☐ ● | 0 | ◇ ■ ○ | |
| 9b | ① ② ③ | 0 | ❶ ❷ ❸ | |
| 10b | FROG  HORSE  LION | 0 |  | |
| 11b | 3 + 5 = ? | | 3 + 5 = ? | |

METHOD AND APPROACH FOR LINKING OF DEVICES WITHIN A COMMUNICATION SYSTEM

TECHNICAL FIELD OF THE INVENTION

The present invention relates to a method for linking of a first characteristic of a first device to a second characteristic of a second device. The invention also concerns a server and a computer program loadable into a processing unit of a server.

BACKGROUND OF THE INVENTION

Linking of devices is defined by the achieving of an association of one or more characteristics of a first device with one or more characteristics of one or more further devices. A characteristic allows typically to identify a device, however, in a more general sense a characteristic can relate to any kind of information associated with a device. For linking of a first device to a second device, one or more characteristics of the first device are associated to one or more characteristics of the second device. One or more of the associated characteristics can be determined from the respective devices or from further entities knowing the respective characteristics. In general, linking of devices provides extended information due to the linkage, e.g. by revealing that two devices are linked at some point in time. A table may be used for the association of characteristics and characteristics may be different for different implementations of the linking method.

Linking of devices is increasingly used for authentication purposes. When trying to access an institution like a system or service or device via a non-trusted device like a computer terminal or an automatic teller machine (ATM) or a door, an institution for that access is requested to initially does not have knowledge on the operator of the non-trusted device. For a lot of situations like downloading publicly available information from the Internet or entering a public building this lack of knowledge is not problematic to the institution, i.e. access to the institution is provided via the non-trusted device to any person that is able to operate the non-trusted device. However, for accessing an institution where access restrictions apply, knowledge regarding the legitimization for access is necessary. This knowledge can be e.g. provided by an authentication procedure like verifying a user identity and a password entered into the non-personal device. Alternatively, linking to a trusted device can be used for authentication for granting access.

A trusted device is a device that is associated with an access legitimization as the main characteristic of a trusted device. An access legitimization legitimates the trusted device to access a particular institution. When presenting the trusted device to the particular institution, the access legitimization achieves that access to the particular institution is granted to the trusted device. The particular institution or an entity supporting the particular institution can have certain criteria to verify the access legitimization for granting access. Examples for a trusted device are a mobile phone being legitimated for accessing a mobile telephone network or a credit card being legitimated for accessing a payment service. Depending on the trusted device and the processing of the verification of the access legitimization, an identity of the legitimate owner of the trusted device can be obtained or it can be proven that that a person operating a trusted device is identical to or is authorized by the legitimate owner. The respective information may be associated with the access legitimization of the trusted device.

Thus, when requesting access to an institution via a non-trusted device, a trusted device with an associated access legitimization can be presented. The associated access legitimization can be determined and can be associated to a characteristic like an identifier of the non-trusted device requesting access to the institution. Alternatively, a characteristic of the trusted device referring to the access legitimization associated with the trusted device can be associated to the characteristic of the non-trusted device. The institution to that the access legitimization associated with the trusted device legitimates for access does not necessarily have to be identical to the institution to that the non-trusted device requests access to. Agreements between different institutions can ensure that an access legitimization legitimating for access to a first institution legitimates also for access to a second institution. The associated characteristics of the trusted and non-trusted device can be stored in a database for further processing, e.g. for statistical, charging or legal purposes. Based on the associated characteristics of the non-trusted and trusted device, access can be granted to or via the non-trusted device, because now the institution or the entity supporting the institution for authentication purpose is provided with knowledge on an access legitimization linked to a characteristic of the non-trusted device like an identifier identifying the non-trusted device. Depending on the trusted device and the implementation of the linking method, information about an identity of the legitimate owner of the trusted device or a proof that an operator of the trusted device is identical to or is authorized by the legitimate owner of the trusted device can be obtained and associated to the respective characteristic of the non-trusted device. Also an identity of the institution that is to be accessed can be associated.

More secure linking methods require in addition to the association of characteristics a proof that a first device and a second device that are to be linked are located in close proximity. The proof of the close proximity is seen as sufficient evidence that the operator of the first device is identical to or at least authorized by the operator of the second device.

Different solutions exist for proving the close proximity that are described in the following:

According to a first solution, a local connection between a first device and a second device that are to be linked can be used to send linking data from a server, e.g. a payment or authentication server, via the first device and the second device and than back to the server or vice versa. A successful round-trip of the linking data is sufficient proof for the existing local connection and thus for the close proximity. Local physical connections like cables, docking stations, card readers or local wireless connections with transmission ranges of about less than 10 meters as provided by Infrared (IR) or Bluetooth can be used.

According to a second solution, a person manually transfers linking data from a first device to a second device for proving the close proximity. For example, an authentication server supporting an institution that is to be accessed by a non-trusted device sends a randomly generated one-time password (OTP) as linking data to the trusted device. The person that operates the trusted device and the non-trusted device reads the linking data and manually types the linking data into the non-trusted device. As in the first solution, the round-trip of the linking data is seen as proof for the close proximity.

U.S. Pat. No. 6,259,909 describes a round-trip of a code word used in a method for secure access by a user to a remote system. After an authentication of a first communications device by an access device, a code word is transmitted from the access device to a second communications device. Said code word received by the second communications device is further transmitted from the second communications device via the first communications device to said access device which can grant to the first and/or second communications device access to the remote system after a check for correctness of the code word received from the first communications device. A data processing unit can be used as first communications device and a mobile phone may be used as second communications device.

The aforementioned solutions for proving the close proximity have disadvantages. A local connection requires compatible interfaces at the devices that are to be linked for transferring the data from one device to the other device. However, compatibility of interfaces is very often not given thus limiting the applicability of solutions based on local connections to a small fragment of a potential market. This is especially true for local wireless connections, because appropriate local wireless interfaces like IR or Bluetooth transceivers are rather seldom on devices like personal computers (PCs), workstations, ATMs or older mobile phones. Using local physical connections requires to physically connect devices that are to be linked. However, physically connecting devices is an inconvenient and often even annoying task. Similarly, line-of-sight local wireless connection techniques like IR require appropriate aligning transceivers of devices that are to be linked. Furthermore, replacing a device by an appropriate further device requires to first remove the local connection from the device that is to be replaced and to attach the removed local connection to the appropriate further device thus increasing the inconvenience for the operator.

Solutions based on manually transferred linking data requires the person that operates the first and the second device to be active in a sense that the person has to read the linking data that is to be transferred manually from the first device and to type it into the second device. In order to prevent to guess the linking data, the linking data should not be too short. However, reading of a longer sequence from the first device and typing of the longer sequence into a second device is not convenient and the probability for mistyping increases with the length of the sequence. It is annoying when the linking is rejected because of any reading or typing errors.

SUMMARY OF THE INVENTION

It is an object of the present invention to provide a method, a device, and a computer program, which enable a convenient linking of a first characteristic of a first device and a second characteristic of a second device.

For the linking of a first characteristic of a first device and a second characteristic of a second device by a server the following steps are executed.

In a first step, a first linking information and a second linking information are selected with the requirement that the first linking information and the second linking information match. To this end, the first linking information does not necessarily have to be identical to the second linking information.

Next, the first linking information is sent from the server to the first device and the second linking information is sent from the server to the second device.

Furthermore, the first linking information is presented by the first device and the second linking information is presented by the second device. Presenting is to be understood as an output to a person. The output by the first device can be different from the output by the second device, however, the matching of the first linking information and the second linking information must be recognizable. Examples for non-identical matching linking information may be a first linking information being complementary or successional to a second linking information.

After recognizing that the first linking information that is presented by the first device and the second linking information that is presented by the second device match, an indication of the matching is entered into the first device. For example, the operator of the first device can press a button on the first device or an appropriate voice-command can be used for entering the indication of the matching.

Based on the entered indication of the matching, the first device sends to the server a matching confirmation. The matching confirmation confirms to the server the matching of the first linking information presented by the first device and the second linking information presented by the second device.

Based on the received matching confirmation, the first characteristic and the second characteristic are associated e.g. by correlating the first characteristic and the second characteristic in a table.

The proposed method enables a convenient linking of a first characteristic of first device and a second characteristic of a second device. Comparing of a first linking information presented by a first device and a second linking information presented by a second device and confirming the matching at one of the two devices according to the present invention requires much less action by a person compared to linking methods based on manually transferred linking data, because no lengthy sequences have to be read from a first device and manually typed into a second device. In addition, the possibility of mistyping can be completely avoided as no linking information has to be typed in making the proposed method much more convenient for a person. Furthermore, the method according to the invention does not require a local connection between the first device and the second device thus rendering compatible interfaces and attaching or removing of local connections unnecessary while at the same time increasing the applicability. Presenting of matching linking information by the first device and by the second device is furthermore advantageous, because it frees the operator of a first device from being aware of an address of a second device that is to be linked to said first device as it is the case for linking methods that require to enter or confirm an address of said second device at the first device for confirming the linking. However, very often an address of a device is not available, e.g. the address is not displayed or cannot be read out, or may change temporarily. Especially for a non-trusted device applies that an address is often not available for the operator, thus making the proposed method very suited for linking non-trusted devices, e.g. for linking an IP-address and port of a first computer terminal as first non-trusted device to an IP address and port of a second computer terminal as second non-trusted device for establishing a computer network comprising the two computer terminals.

According to a preferred embodiment, the first device is a trusted device and the first characteristic relates to an access legitimization that legitimates to access a first institution. Relating means that the first characteristic comprises the access legitimization and/or an identifier from that the access legitimization can be obtained. An example for an identifier from that an access legitimization legitimating for accessing a mobile telephone network can be obtained is a Mobile Station Integrated Services Digital Network Number (MSISDN) of a mobile phone. The associated characteristics can be further processed, e.g. for statistical, charging, or legal purpose.

According to another preferred embodiment, the second characteristic of the second device comprises an identifier identifying the second device. Access to a second institution is granted to or via the second device based on the associating of the first characteristic relating to the access legitimization and the second characteristic comprising the identifier. The second institution can be identical to or different from the first institution. Agreements can ensure that an access legitimization for accessing the first institution legitimates also for access to the second institution. Thus, the associating of the characteristic relating to the access legitimization and the second characteristic comprising the identifier for identifying the second device can provide the information that the second device is legitimated for accessing the second institution. Based on that information, access to the second institution can be granted. An access assertion may be sent from the server to the second device, to the second institution or a further entity supporting the second device or the second institution for granting access. The access assertion may comprise an access legitimization that legitimates for accessing the second institution which can be e.g. derived from the access legitimization that legitimates for accessing the first institution. Access to the second institution can be e.g. achieved by unlocking the second device for appropriate usage.

According to another preferred embodiment, a request for authentication triggers the linking. A request for authentication is common for conventional authentication methods thus decreasing the implementation effort when using the proposed linking method for authentication purpose. Especially if an authentication is required for accessing the second institution, the second institution may just send the request for authentication and wait for an access assertion before granting access to the second device as it is the case for conventional authentication methods. Accordingly, the second institution does not necessarily have to be adapted to the particularities of the proposed method thus increasing the applicability of the proposed method.

According to another preferred embodiment, the first linking information and the second linking information comprise one or more randomly generated symbols. Randomly generated symbols are beneficial due to security reason, because the probability is reduced that identical or similar linking information is presented in a first linking and in a second linking. Especially, if multiple non-trusted devices are located in close proximity, a person that has to confirm a matching of linking information may get easily confused if the same or very similar linking information is presented on the multiple non-trusted devices in his environment. Furthermore, randomly generated symbols are also advantageous, because the linking information can be processed in the way of a one-time password which is beneficial if the method according to the present invention is to be combined with a conventional linking method using one-time passwords. Examples for a symbol are a digit, a letter, an image, a photo, a picture, or an icon. Advantageous for the usage of digits, letters, and/or icons is their easy processing and presenting on a device having a simple display like it is integrated in a conventional Global System for Mobile Communication (GSM) mobile phone. Another advantage of digits and/or letters is that they can be easily converted for an acoustically presentation. The presenting of graphics like images, photos, pictures, and/or icons can be advantageous because a person usually recognizes more intuitively and faster the matching of graphics compared to letters and/or digits making the method more convenient.

According to another preferred embodiment, the first linking information is identical to the second linking information. Comparing and confirming the matching of identical linking information is typically more convenient compared to comparing and confirming of non-identical matching linking information. In addition, the usage of identical linking information is easier to implement in the server.

According to another preferred embodiment, the associating of the first characteristic and the second characteristic can be based on a verification for correctness of confirmation data entered into the first device. The entering of confirmation data can be advantageous for security reasons, e.g. for making a person more aware or for personal authentication. For verification of the correctness of the entered confirmation data, the entered confirmation data has to match to predefined confirmation data. The first device or the server or both can execute the verification. If the server verifies the entered confirmation data, the confirmation data entered into the first device or data produced in the first device based on the entered confirmation data is to be sent to the server, e.g. included or attached to the matching confirmation. The server compares the entered confirmation data or the produced data to predefined confirmation data and executes the associating of the characteristics if the entered confirmation data or the produced data, respectively, matches to the predefined confirmation data. If the first device executes the verification, the first device has access to the predefined data that enables the first device to verify the entered confirmation data for correctness, e.g. the predefined data can be sent from the server to the second device or the predefined data can be stored on the second device. The first device compares the entered confirmation data with the predefined confirmation data and sends the matching confirmation to the server if the entered confirmation data matches to the predefined confirmation data. The method may be implemented in a way that the sending of the matching confirmation is an implicit indication for the verification for correctness of the entered confirmation data by the first device to the server. Based on the verification for correctness, the server can execute the associating of the first and the second characteristic. Depending on the implementation, the confirmation data may be entered for indicating the matching of the linking information thus reducing the number of steps to be executed.

According to a preferred embodiment, the confirmation data comprises at least one of (a) a Personal Identification Number, (b) a password, (c) an indication for additional information being presented in parallel to the first linking information or second linking information, the additional information being distinguishable from the first linking information and the second linking information, and (d) data being computed on the base of the first linking information and/or the second linking information. An entered Personal Identification Number (PIN) allows to personally authenticate the person that currently operates the first device and is especially advantageous to avoid unauthorized usage e.g. by preventing a thief to use a stolen device for a linking according to the invention. A password can be used in the same manner, but it may be easier to remember than a PIN. Presenting of the additional information in parallel to the first linking information or the second linking information may force the operator to thoroughly study the presented information in order to recognize the matching thus making the proposed method more secure. In addition, an indication for the additional information can be very short and easy to enter, e.g. by a digit or letter indicating the additional information. An alternative solution is entering of data being computed on the base of the first linking information and/or the second linking information that also increases the awareness of the person and thus makes the method more secure. Also, some persons may find the proposed linking method attractive just because of the computing step that requires the person to think for the correct answer, i.e. the correct confirmation data.

The present invention also concerns a server in order to implement the method as described above.

The server can be used for linking of a first characteristic of a first device and a second characteristic of a second device. The server comprises a receiving unit for receiving messages, a transmitting unit for sending messages, and a processing unit for processing messages and information. The processing unit is adapted to select a first linking information and a second linking information. The first linking information matches to the second linking information. The transmission unit is adapted to send the first linking information to the first device and the second linking information to the second device. The receiving unit is adapted to receive a matching confirmation from the first device with the matching confirmation confirming to the processing unit the matching of the first linking information presented by the first device and the second linking information presented by the second device. The processing unit is adapted to execute an associating of the first characteristic and the second characteristic based on the received matching confirmation.

According to a preferred embodiment, the first device is a trusted device and the first characteristic relates to an access legitimization legitimating the trusted device for accessing a first institution.

According to another preferred embodiment, the second characteristic comprises an identifier identifying the second device and, based on the associating of the first characteristic relating to the access legitimization and the second characteristic comprising the identifier, the processing unit is adapted to generate an access assertion for granting to or via the second device access to a second institution being identical or different from the first institution, and the transmission unit is adapted to send the access assertion to the second device or the second institution or to an entity supporting the second device or the second institution for granting access.

According to another preferred embodiment, the receiving unit is adapted to receive a request for authentication triggering the processing unit to execute the linking.

According to another preferred embodiment, the processing unit is adapted to select the first linking information and the second linking information to comprise one or more randomly generated symbols.

According to another preferred embodiment, the processing unit is adapted to select the first linking information being identical to the second linking information.

According to another preferred embodiment, the processing unit is adapted to execute the associating of the first characteristic and the second characteristic based on a verification for correctness of confirmation data entered into the first device.

The present invention also concerns a computer program comprising portions of software codes in order to implement the method as described above when operated on a server. The computer programs can be stored on a computer readable medium. The computer-readable medium can be a permanent or rewritable memory within a server or located externally. The respective computer program can be also transferred to a server for example via a cable or a wireless link as a sequence of signals.

The computer program can be used for linking of a first characteristic of a first device and a second characteristic of a second device. The computer program can be loaded into a processing unit of a server and comprises code adapted to select a first linking information and a second linking information. The first linking information matches to the second linking information. The computer program comprises code adapted to initialize a sending of the first linking information to the first device and a sending of the second linking information to the second device and to execute an associating of the first characteristic and the second characteristic based on a matching confirmation received from the first device with the matching confirmation confirming to the computer program the matching of the first linking information presented by the first device and the second linking information presented by the second device. The computer program can be used in all embodiments of the method as described.

In the following, detailed embodiments of the present invention shall be described in order to give the skilled person a full and complete understanding. However, these embodiments are illustrative and not intended to be limiting, as the scope of the invention is defined by the appended claims.

BRIEF DESCRIPTION OF THE DRAWINGS

FIG. 1b shows examples of processes and messages between devices according to the first embodiment of FIG. 1a;

DETAILED DESCRIPTION OF THE INVENTION

Figure 1A:
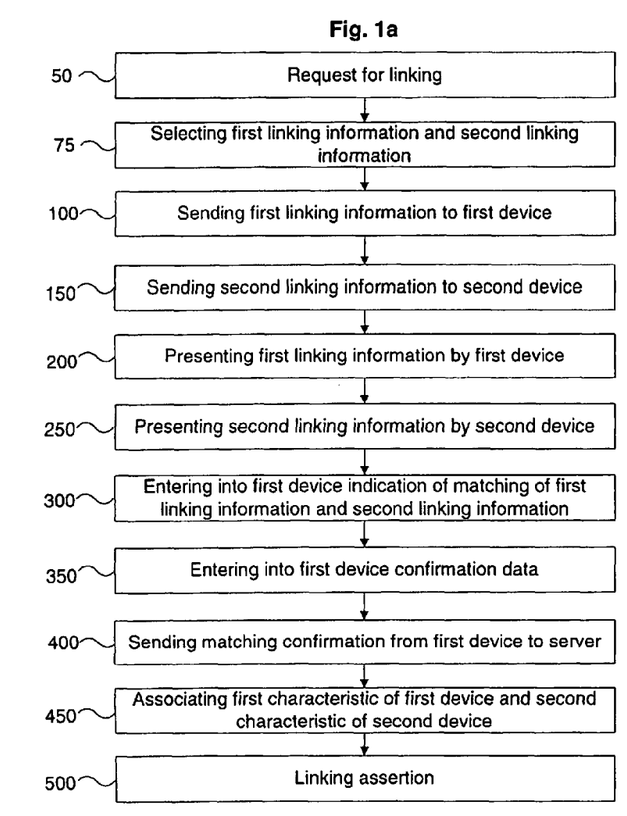
FIG. 1a shows a flowchart diagram of a first embodiment of the present invention.
Figure 1B:
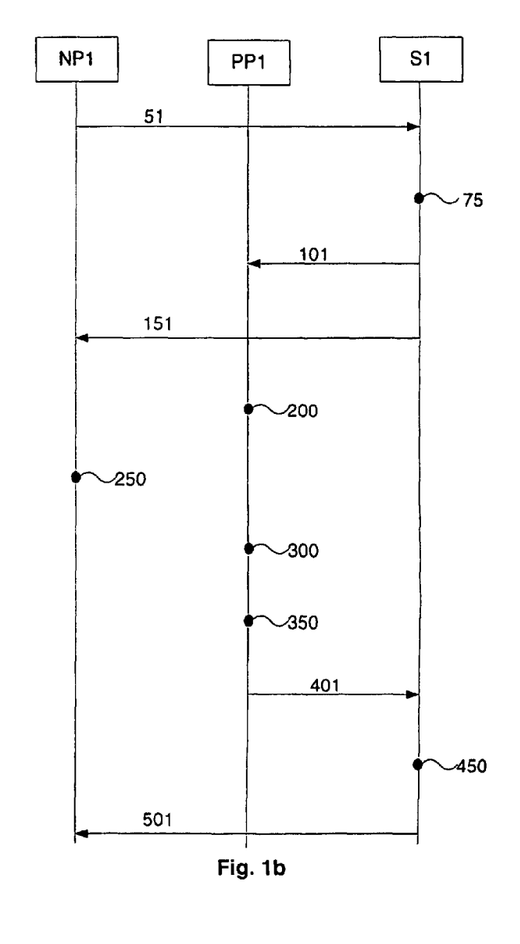

FIG. 1a shows a flowchart diagram of a first embodiment of the present invention in which a request 50 for linking triggers the following steps of the method. FIG. 1b shows examples of processes and messages between devices, i.e. a first device PP1 and a second device NP1 that are to be linked and a server S1, for carrying out the method according to the flow-chart depicted in FIG. 1a. In the following, FIGS. 1a and 1b are described in parallel. Identical references in FIGS. 1a and 1b describe corresponding features.

According to FIG. 1a, the first embodiment starts with a request 50 for linking. The request 50 for linking may originate from an entity being external to the server S1 or by the server S1 itself. The request 50 for linking can be sent from the second device NP1 to the server S1 by a request message 51 as depicted in FIG. 1b. The request 50 for linking triggers the server S1 to link the first device PP1 and the second device NP1 by associating a first characteristic of the first device PP1 and a second characteristic of the second device NP1. In the request message 51, the server S1 can be provided with an address of the second device NP1. Furthermore, the request message 51 can comprise an address of the first device PP1. Subsequently, the server S1 selects 75 the first linking information and the second linking information. Furthermore, the server S1 sends 100 the first linking information via message 101 to the first device PP1 and sends 150 the second linking information via message 151 to the second device NP1. Subsequently, the first linking information is presented 200 by the first device PP1 and the second linking information is presented 250 by the second device NP1. After comparing the presented linking information and recognizing that the presented information match, the person that operates the first device PP1 executes an entering 300 of an indication of the matching into the first device PP1. Preferably, a request is output by the first device PP1 for the entering 300 of the indication of the matching and if tighter security requirements apply also for entering 350 of confirmation data like a PIN into the first device PP1. According to the present example, the entered confirmation data is verified by the first device PP1 for correctness. The entering 300,350 of the indication of the matching and of the correct confirmation data triggers the sending 400 of a matching confirmation from the first device PP1 to the server S1 via message 401. The matching confirmation confirms the matching of the first linking information that is presented on the first device PP1 and the second linking information that is presented on the second device NP1 and additionally provides the server S1 with information that the operator of the first device PP1 has been personally authenticated by entering the correct PIN. Furthermore, the server S1 is provided by the received matching information with a proof of the close proximity of the first device PP1 and the second device NP1 such that the server S1 can assume that the person operating the second device NP1 is identical to or at least being authorized by the person operating the first device PP1. Based on the received matching confirmation, an associating 450 of a first characteristic of the first device PP1 and a second characteristic of the second device NP1 can be executed by the server S1. Which characteristics are to be associated 450 may be indicated in the request 50 for linking. Additional determination steps may be executed to determine appropriate characteristics that are to be associated. A suitable example is to associate an address of the first device PP1 and an address of the second device NP2, e.g. the addresses that are known to the server S1 for sending 100,150 the linking information. Based on the associating 450 of the first characteristic and the second characteristic, a linking assertion can state the successful linking of the two devices PP1,NP1. The linking assertion may be sent 501 to the second device as response to the request 50 for linking.

When using as first device PP1 a trusted device, additional verification steps may be advantageous that are not shown in FIG. 1. In this case, the server may verify the access legitimization of the personal device for executing the linking, e.g. before sending the linking information to the respective devices. Especially, if access to an institution is requested for or via the second device NP1, it can be checked if appropriate agreements exist allowing to access the institution by or via the second device NP1 based on the access legitimization of the trusted device. For example, it can be checked if an access legitimization of a mobile phone legitimating the mobile phone for accessing a mobile telephone system like a GSM or Universal Mobile Telecommunication System (UMTS) legitimates also for accessing an Internet service as example for the institution to that access is requested to via a computer terminal as example for a second device. By associating a first characteristic relating to the access legitimization of the first device, e.g. a mobile phone number as first characteristic, and a second characteristic that allows to identify the second device, access for or via the second device to the institution can be granted.

For using the method as described in conjunction with FIG. 1a for authentication purpose, it is advantageous to replace the request 50 for linking and the linking assertion 500 by an appropriate request for authentication and an authentication assertion, respectively, and using as first device PP1 a trusted device. The request for authentication may be sent via message 51 to the server S1. The steps 75-450 and corresponding processes and messages 75-450 can be executed as explained in conjunction with FIG. 1. Based on the linking, the authentication assertion can be sent for granting access. For example, the authentication assertion may be sent via message 501 to the second device effecting e.g. an unlocking of the second device NP1 for getting access.

In general applies for the first and second device the following: for receiving the first linking information at the first device, the first device is equipped with a first receiving unit and for receiving the second linking information by the second device, the second device is equipped with a second receiving unit. For presenting the first linking information by the first device, the first device is equipped with a first output unit and for presenting the second linking information by the second device, the second device is equipped with a second output unit. Examples for an output unit are a display, a loudspeaker, or a printer, or a device that allows presenting of linking information by embossed symbols. The second device can be equipped with an input unit like a keypad or microphone for triggering the linking method e.g. by a request for authentication or linking. For the entering of the indication of the matching and the confirmation data if applicable, the first device is equipped with an input unit like a keypad, microphone, or touch-screen.

One or more of the aforementioned units for the first device and/or the second device may be removable. The fact that the first device and/or the second device do not necessarily need to have an integrated receiving unit, transmission unit, input unit and/or output unit makes the proposed method much more flexible, e.g. as trusted device a credit card can be used inserted into a device similar to a card reader having in addition an input and output unit and a receiving and transmission unit as explained before. Furthermore, a presenting of linking information by a loudspeaker or in Braille makes the proposed method also easily operable by blind persons.

In the following examples for trusted devices are described that may be used in the proposed linking method: firstly, a trusted device that legitimates for access to an institution without revealing an identity of the legitimate owner of the trusted device: according to this first example, one or more characteristics associated with the trusted device that are determinable by the institution when presenting the trusted device for getting access do not allow to identify the legitimate owner. To this end, a trusted device according to the first example can be provided to the legitimate owner without associating an identity of the legitimate owner to said one or more determinable characteristics. An example for such a trusted device is a ticket that legitimates for accessing an institution by revealing as access legitimization a name of said institution and a serial number not being associated with an identity of the legitimate owner. Secondly, a trusted device that legitimates for access to an institution which allows to obtain an identity of the legitimate owner; according to the second example, at least one of the characteristics of the trusted device determinable the institution is associated with an identity of the legitimate owner. Said identity can be stored at the trusted device, at the institution, and/or a further entity accessible by the institution. When said identity is stored at the institution and/or at the further entity, the trusted device has to be uniquely identifiable by the institution in order to obtain the identity of the legitimate owner. Thirdly, a trusted device that legitimates for access to an institution allowing a personal authentication, i.e. it is possible to prove that the person that operates the trusted device is identical to or is authorized by the legitimate owner. A secret like a Personal Identification Number (PIN) personally issued to the legitimate owner or a user identity—password mechanism or personal information uniquely relating to the legitimate owner like a signature or photo can be used for personal authentication when presenting the trusted device for getting access.

Authorization by the legitimate owner can be achieved by providing said secret to a further person that enables the further person to access the institution when presenting the trusted device. Examples for trusted devices allowing personal authentication are a credit card in combination with a signature or a GSM mobile phone in combination with a PIN.

For linking of a trusted device, it depends on the trusted device and the processing of characteristics determinable by the server for the linking if information about the legitimate owner as explained before is provided to the server. If information about the legitimate owner is determinable, this information can be used in the associating step. As a general rule, for tighter security requirements a higher example number of trusted device is preferably used. In addition, a trusted device can be associated with characteristics like the date of issue, the date of expiry, or a value associated with trusted device that can be considered e.g. for the linking and/or for granting access.

Figure 2:
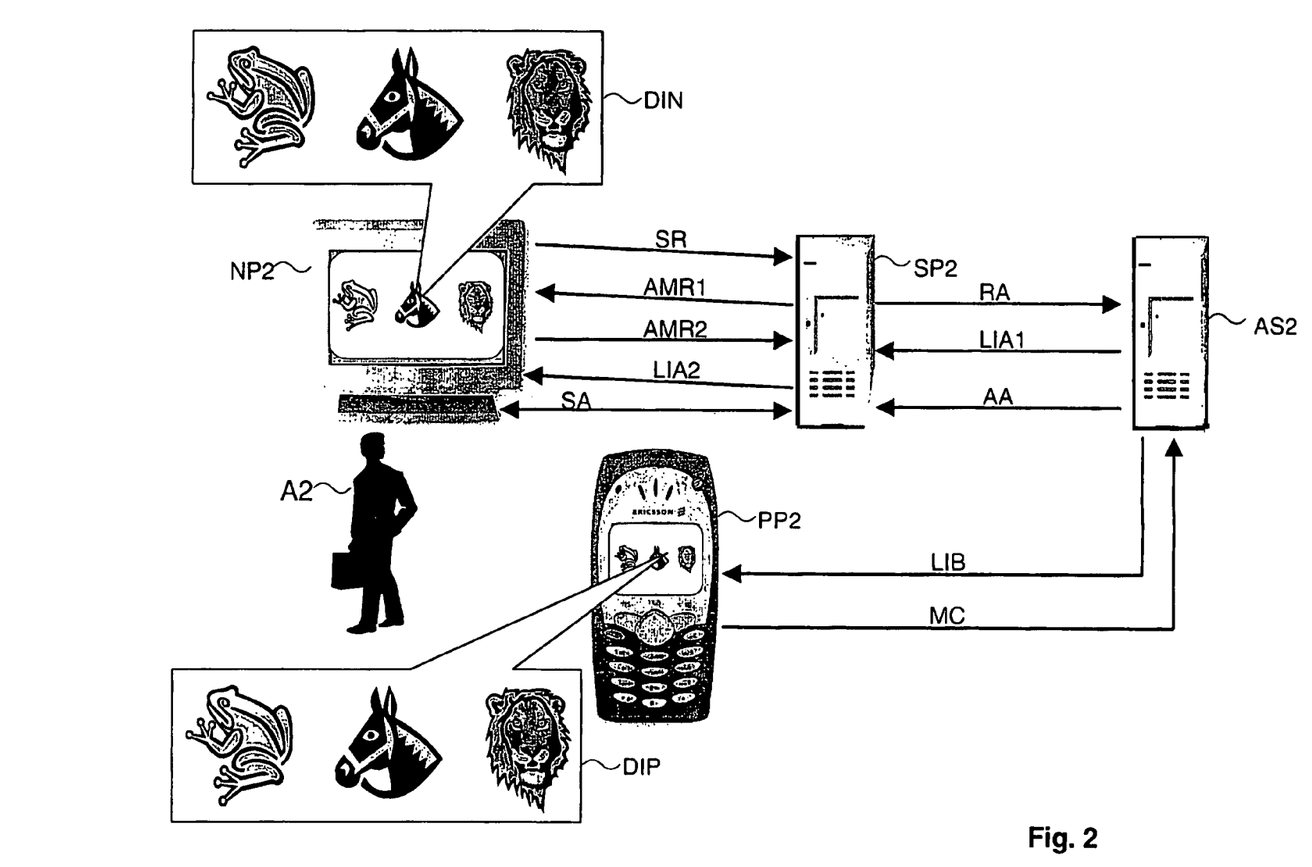
FIG. 2 shows an operator, devices and messages between devices of a second embodiment of the present invention.

FIG. 2 shows a second embodiment of the proposed method. A person A2 that operates a trusted device depicted as mobile phone PP2 and a non-trusted device depicted as a computer terminal NP2 wants to access via the computer terminal NP2 a service provided by a server SP2 in the Internet. The computer terminal NP2 sends a request SR for service access to the server SP2 providing the service in the Internet. The server SP2 recognizes that an authentication is required for the requested service. The server SP2 can respond to the computer terminal NP2 with an authentication request message ARM1 asking for authentication, e.g. by asking to enter a MSISDN number. The person A2 enters the MSISDN number of the mobile phone PP2 into the computer terminal NP2 and sends in an authentication response message ARM2 the entered MSISDN number to the server SP2. The authentication response message ARM2 can carry also the address of the computer terminal NP2 like an Internet Protocol (IP) address and a port number. Based on the received authentication response message ARM2, the server SP2 sends a request RA for authentication to the server AS2. According to the present example, the request RA comprises the MSISDN number of the mobile phone PP2, the IP address and port number of the computer terminal NP2 and an IP address and port number of the server SP2. Optionally, an identifier or a name of the service and/or service provider and the time the request SR for service was received at the server SP2 can be included into the request RA. Triggered by the request RA, the server AS2 proceeds as follows: The server AS2 accepts the received MSISDN number as being legitimated for access to a mobile telecommunication system. Based on an analysis of the MSISDN number the server AS2 may also detect that the MSISDN number corresponds to a particular network operator. According to the present example, the server AS2 checks if the access legitimization according to the MSISDN number legitimates also for access to the service provided by the server SP2, e.g. according to an appropriate agreement made in advance or on request or by assuming an implicit agreement due to the fact that the server SP2 sends the MSISDN number in the request message 51. If personal authentication is required, the server AS2 may in addition obtain an identity of the legitimate owner of the MSISDN number, e.g. name and address of the person A2 presenting the mobile phone PP2 as trusted device.

After accepting the MSISDN number of the mobile phone PP2 and the approval of the associated access legitimization, the server AS2 proceeds with the linking by selecting a first and a second linking information. According to the present example, the server AS2 selects and sends an identical sequence of pictures to the mobile phone PP2 and to the computer terminal NP2. The linking information for the computer terminal NP2 is sent in a message LIA1 to the server SP2 which further sends the linking information for the computer terminal NP2 via message LIA2 to the computer terminal NP2 where the linking information is presented on the computer screen as shown by the screen image DIN. The linking information for the mobile phone PP2 is sent in a message LIB, e.g. via Short Message Service (SMS) or Multimedia Messaging Service (MMS) or WAP (Wireless Application Protocol) push, to the mobile phone PP2. The linking information is presented on the display of the mobile phone PP2 as shown by the screen image DIP. The method becomes more convenient and more secure, if the linking information presented on the mobile phone PP2 is presented in parallel with a request like "Dear [Name of person], You want to access the service [Name of service] at [Time of service request]. Please confirm the matching of the linking information presented on your mobile phone and your non-trusted device [Address] by pressing the YES button on your mobile phone followed by entering your PIN."

The aforementioned request text includes entries given in brackets. These entries like the name of the person A2, the name of the service, the time of service request, and an address of the non-trusted device can be included into the message LIB and thus provided to the mobile phone PP2 for presentation if the server AS2 has this information available as explained before.

If the linking information in the form of a sequence of pictures presented on the display of the mobile phone PP2 and on the screen of the computer terminal NP2 is identical and thus matches, the person A2 presses the "YES" button on the mobile phone PP2 and enters his PIN for confirmation of the matching. For the case that the information that is presented by the mobile phone PP2 and the information presented by the computer terminal NP2 do not match, a possible attack may be going on. In this case, the confirmation of the matching can be denied and thus the linking procedure can be terminated, e.g. by pressing "NO" or by entering a wrong PIN. According to the present example, the linking information matches and a matching confirmation is sent via a matching confirmation message MC from the mobile phone PP2 to the server AS2. Based on the received matching confirmation, the server AS2 links the computer terminal NP2 and the mobile phone PP2 by associating e.g. the address of the computer terminal NP2 with the MSIDN number of the mobile phone PP2 and provides the server SP2 with an authentication assertion message AA comprising an authentication assertion. Based on the authentication assertion, the server SP2 can grant service access SA to computer-terminal NP2 for the person A2. If available or requested, the server AS2 may provide personal information related to the person A2 like the name and/or the address and/or a credit card number to the server SP2. The server SP2 can store the provided personal information in a database, e.g. for charging or statistically purposes or legal reasons.

The embodiment of FIG. 2 uses a computer terminal as non-trusted device. However, the embodiments described in conjunction with FIGS. 1a, 1b, and 2 with a non-trusted device being for example a personal digital assistant (PDA), a workstation, a notebook, an ATM, a physical access unit like a door or a physical control device like a steering wheel.

Figure 3A:
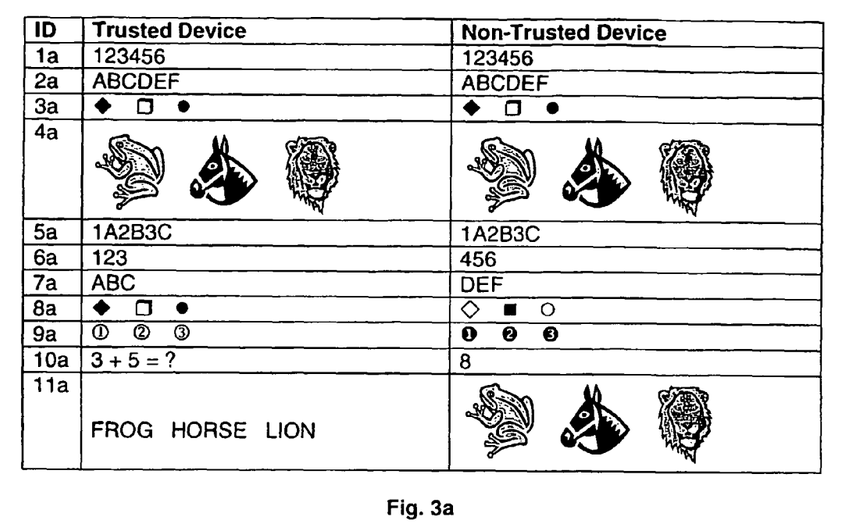
FIG. 3a shows a table comprising a first set of examples of presentations by a trusted and on a non-trusted device.

In FIG. 3a a table is shown with examples of matching linking information presented by a trusted device as an example for a first device and a non-trusted device as an example for a second device. The individual examples of linking information are indicated by identifying numbers (IDs). Identical sequences of digits 1a, of letters 2a, of icons 3a, of pictures 4a, and of a combination of letters and digits 5a are shown as examples for identical linking information. However, as stated earlier, matching linking information does not necessarily have to be identical. Examples for non-identical matching linking information are given in the examples 6a to 11a. Examples 6a and 7a reveal examples for successional matching linking information for sequences of digits and letters, respectively, i.e. sequences starting on the trusted device are continued on the non-trusted device or vice versa. 8a and 9a show examples for complementary matching linking information where a first sequence of icons is presented by the trusted device and a second sequence of icons identical to the first one but with reversed color is presented by the non-trusted device. 10a is an example for a computational matching linking information, i.e. the linking information presented by the non-trusted device can be computed by the linking information presented by the trusted device or vice versa. Example 11a shows a sequence of pictures presented by the non-trusted device. The linking information presented by the trusted device is a sequence of names matching the sequence of pictures in text format. An implementation according to example 11a may be very useful if only one of the devices supports the presentation of pictures. It can be therefore advantageous to provide to the trusted device or to the non-trusted device or both a variety of formats of the linking information from that the format best suited can be selected for increasing the probability for presenting the linking information. Another example for non-identical matching information not shown in FIG. 3a is a puzzle, wherein one or more first parts of the puzzle can be presented by the trusted device and one or more further parts of the puzzle can be presented by the non-trusted device.

Comparing and recognizing of a matching of graphical linking information like pictures, images, or icons can be easier for a person than of non-graphical linking information like digits or letters making the proposed method based on graphical linking information more convenient but also more secure as the probability for an erroneous recognition of the matching is decreased. As an example for a set of 100 icons, a sequence of 3 randomly chosen icons as linking information allows for 1,000,000 different sequences what makes the proposed method sufficiently secure on the one hand. On the other hand, a sequence of 3 icons is very easy and fast to compare compared to e.g. a sequence of six digits, which also allows for 1,000,000 different sequences.

Figure 3B:
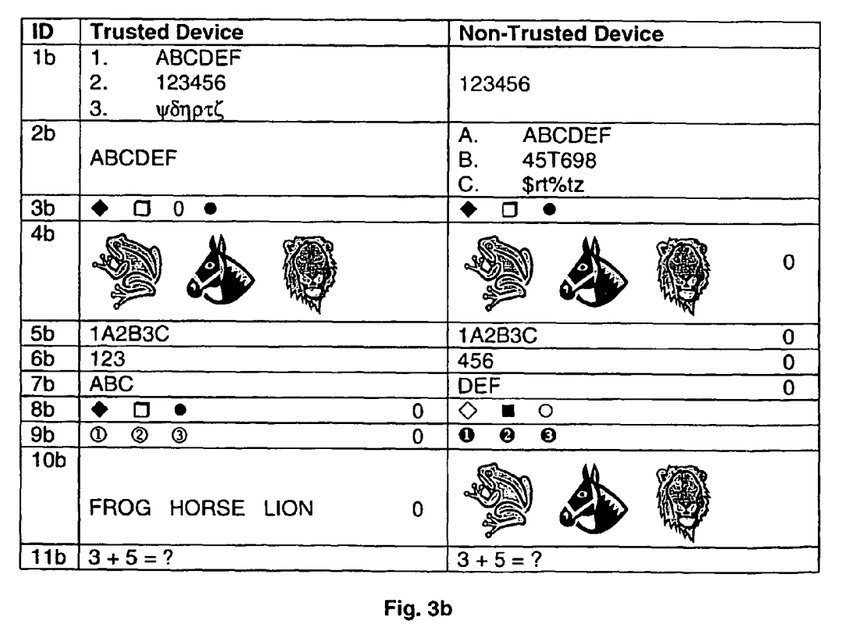
FIG. 3b shows a table comprising a second set of examples of presentations by a trusted and on a non-trusted device.

FIG. 3b is used to explain how an entering of the indication of the matching can be executed and how an entering of confirmation data into the trusted device as an example for the first device can be performed. For this reason, examples for matching linking information presented by the trusted device and by a non-trusted device as example for the second device are shown. The presented matching linking information is supplemented by additional information presented in parallel to the respective matching linking information on one of the devices. For recognizing the matching of the first linking information and the second linking information, the additional information should be clearly distinguishable from the matching linking information, e.g. according to the examples 1b-10b as explained in the following. For entering of an indication for the matching and/or the entering of confirmation data, an appropriate request may be presented by at least one of the devices that are to be linked. The entering of the indication for matching and for the confirmation data can be combined.

According to the first example in 1b, the matching linking information is given by a sequence of digits "123456" on both devices and the additional information by a sequence of Latin letters "ABCDEF" and sequence of Greek letters "ψδηρτξ". The information as presented on the trusted device is numbered and matching of the linking information can be confirmed by typing in "2" into the trusted device for indicating that the information numbered "2" presented by the trusted device is the linking information that matches to the linking information presented by the non-trusted device. Alternatively, a pointing device like a mouse can be used for "clicking" on the linking information or the corresponding identifier, i.e. number "2" according to the present example. Also a vocal entering is possible for indicating the matching.

2b shows a corresponding presentation of matching linking information, i.e. "ABCDEF", and additional information, i.e. "45T698" and "$rt%tz", with the additional information now being presented by the non-trusted device. As identifiers for the matching linking information letter "A" and for the additional information letters "B" and "C" are used. According to this example, an indication of the matching may be executed by entering "A" into the trusted device.

According to the example in 1b and 2b, the entering of the indication of the matching can be also made by trivial means without further making usage of the additional information presented to the person, e.g. by pressing "YES". An additional confirmation step can request the entering of "2" or "A" as confirmation data according to example 1b or 2b, respectively.

Both examples 1b and 2b increase the complexity for the benefit of an increase of the security of the method. The person that operates the trusted device cannot just achieve the linking of the trusted device and the non-trusted device just by pressing a button or by other trivial means. Instead, he is forced to thoroughly compare the information presented by both devices and to make the right choice for the entering.

In the following examples 3b to 10b, the digit "0" represents additional information that can be easily distinguished from the matching linking information according to the present examples. The additional information can be e.g. presented separately from the linking information by the trusted device according to examples 8b to 10b or presented separately from the linking information by the non-trusted device according to the examples 4b to 7b or comprised in the linking information as depicted according to example 3b for additional information comprised in the linking information by the trusted device Additional information comprised in the linking information presented by the non-trusted device is also possible but not shown in FIG. 3b.

According to the examples 3b to 10b, an indication of the matching can be made, e.g. by pressing the "YES" button, and than to enter confirmation data, i.e. the additional information "0" according to the examples 3b to 10b.

In 11b, identical linking information in form of a mathematical equation "3+5=?" is presented by both devices. The correct result "8" can be entered as confirmation data.

Alternatively, the indication for the matching in the examples 3b to 10b and 11b can be combined with the entering of confirmation data e.g. by requesting to indicate the matching by entering the additional information, i.e. "0" and "8" for the examples 3b-10b and 11b, respectively. This implementation has the advantage that reduced action by the operator of the trusted device is required, e.g. pressing the "YES" button can be left out.

The above embodiments admirably achieve the objects of the invention. However, it will be appreciated that departures can be made by those skilled in the art without departing from the scope of the invention which is limited only by the claims.

The invention claimed is:

1. A method for granting access to a second institution for or via a second device by linking of a first characteristic of a first device and a second characteristic of a second device by a server, comprising the steps of:
receiving at the server a request for triggering the following steps:
selecting a first linking information and a second linking information, the first linking information matching to the second linking information,
sending from the server the first linking information to the first device and the second linking information to the second device, where the first device is a trusted device and the first characteristic relates to an access legitimization legitimating the first device for accessing a first institution,
presenting by the first device the first linking information and by the second device the second linking information, the step of presenting being performed after the step of sending such that the first linking information is output on the first device in parallel to output of the second information on the second device,
entering into the first device an indication of the matching of the first linking information and the second linking information,
based on the entered indication of the matching, sending from the first device to the server a matching confirmation for confirming the matching to the server,
associating the first characteristic and the second characteristic based on the received matching confirmation,
for executing the linking, the server further verifying the access legitimization of the first device,
based on the linking, sending a message from the server for granting access to the second institution, and
wherein the second characteristic comprises an identifier identifying the second device and access to a second institution is granted to or via the second device based on the associating of the first characteristic relating to the access legitimization and the second characteristic comprising the identifier, the second institution being identical to or different from the first institution.

2. The method according to claim 1, wherein the request for linking is a request for authentication and the first device is a trusted device within said communication network, further comprising the step of stating the association by an authentication assertion.

3. The method according to claim 2, wherein the authentication assertion is sent for granting access.

4. The method according to claim 1, wherein the first linking information and the second linking information comprise one or more randomly generated symbols.

5. The method according to claim 1, wherein the first linking information is identical to the second linking information.

6. The method according to claim 1, wherein the associating is based on a verification for correctness of confirmation data entered into the first device.

7. The method according to claim 6, wherein the entered confirmation data comprises at least one of
(a) a Personal Identification Number,
(b) a password,
(c) an indication for additional information being presented in parallel to the first linking information or second linking information, the additional information being distinguishable from the first linking information and the second linking information, and
(d) data being computed on the base of the first linking information and/or the second linking information.

8. A server for granting access to a second institution for or via a second device by linking of a first characteristic of a first device and a second characteristic of a second device, the server comprising:
a receiving unit for receiving messages,
a transmitting unit for sending messages, and
a processing unit for processing messages and information,
wherein the receiving unit receives a request for linking, the processing unit is triggered by the received request for linking and selects a first linking information and a second linking information, the first linking information matching to the second linking information,
the transmission unit sends the first linking information to the first device and the second linking information to the second device such that the first linking information is output on the first device in parallel to output of the second linking information on the second device, the first device being a trusted device and the first characteristic relating to an access legitimization legitimating the first device for accessing a first institution,
the receiving unit receives a matching confirmation from the first device, the matching confirmation confirming to the processing unit the matching of the first linking information presented by the first device and the second linking information presented by the second device,
the processing unit executing an associating of the first characteristic and the second characteristic based on the received matching confirmation, and for executing the linking, to further verify the access legitimization of the first device, and, based on the linking, to send via the transmission unit a message for granting access to the second institution, and
wherein the second characteristic comprises an identifier identifying the second device and, based on the associating of the first characteristic relating to the access legitimization and the second characteristic comprising the identifier, the processing unit is adapted to generate an access assertion for granting to or via the second device access to a second institution being identical or different from the first institution, and the transmission unit is adapted to send the access assertion to the second device or the second institution or to an entity supporting the second device or the second institution for granting access.

9. The server according to claim 8, wherein the server is used for authentication, the request for linking is a request for authentication and the first device is a trusted device, the processing unit being further adapted to state the association by an authentication assertion.

10. The server according to claim 9, wherein the transmission unit is adapted to send the authentication assertion for granting access.

11. The server according to claim 8, wherein the processing unit is adapted to select the first linking information and the second linking information to comprise one or more randomly generated symbols.

12. The server according to claim 8, wherein the processing unit is adapted to select the first linking information being identical to the second linking information.

13. The server according to claim 8, wherein the processing unit is adapted to execute the associating of the first characteristic and the second characteristic based on a verification for correctness of confirmation data entered into the first device.

14. A non-transitory computer readable medium having stored thereon a plurality of instructions including instructions which, when executed by a processor, cause the processor to perform the steps of a method for granting access to a second institution for or via a second device by linking of a first characteristic of a first device and a second characteristic of a second device, comprising of:

responsive to a request received at the server, triggering the following steps:

selecting a first linking information and a second linking information, the first linking information matching to the second linking information, initializing a sending of the first linking information to the first device and a sending of the second linking information to the second device such that the first linking information is output on the first device in parallel to output of the second linking information on the second device, the first device being a trusted device and the first characteristic relating to an access legitimization legitimating the first device for accessing a first institution, and executing an associating of the first characteristic and the second characteristic based on a matching confirmation received from the first device, the matching confirmation confirming the matching of the first linking information presented by the first device and the second linking information presented by the second device, and for executing the linking, further verifying the access legitimization of the first device, and, based on the linking, initializing a sending of a message for granting access to the second institution, and wherein the second characteristic comprises an identifier identifying the second device and access to a second institution is granted to or via the second device based on the associating of the first characteristic relating to the access legitimization and the second characteristic comprising the identifier, the second institution being identical to or different from the first institution.

15. The computer readable medium of claim 14 wherein the association is further based on a verification for correctness of confirmation data entered into the first device.

16. The computer readable medium of claim 15 wherein said entered confirmation data includes a password.

* * * * *

UNITED STATES PATENT AND TRADEMARK OFFICE
CERTIFICATE OF CORRECTION

PATENT NO.         : 7,954,137 B2
APPLICATION NO.    : 10/530829
DATED              : May 31, 2011
INVENTOR(S)        : Schuba Page 1 of 1

It is certified that error appears in the above-identified patent and that said Letters Patent is hereby corrected as shown below:

On the Title Page, in Field (56), under "OTHER PUBLICATIONS", in Column 2, Lines 3-6, delete "Asokan Net......................1389-1268.*.

In Column 9, Line 36, delete "PP1,NP1." and insert -- PP1, NP1. --, therefor.

In Column 12, Line 47, delete "MSIDN" and insert -- MSISDN --, therefor.

Signed and Sealed this
Ninth Day of April, 2013

Teresa Stanek Rea
*Acting Director of the United States Patent and Trademark Office*